United States Patent Office 3,553,598
Patented Jan. 5, 1971

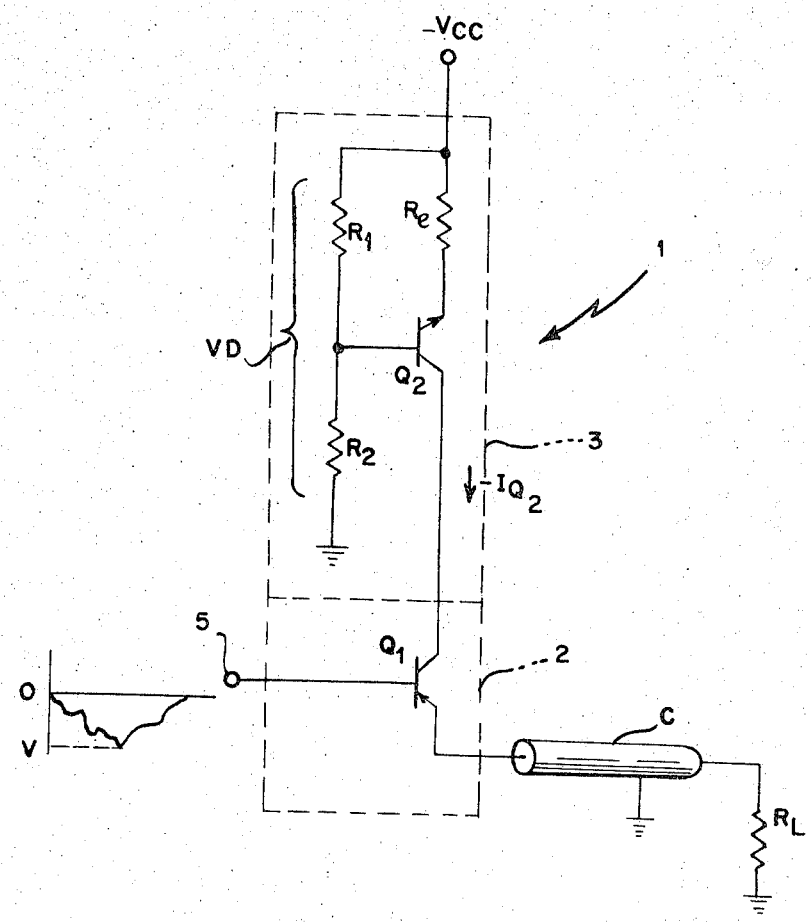

3,553,598
TRANSISTORIZED DRIVER CIRCUIT
Robert H. Reif, Groton, Mass., assignor to Sylvania Electric Products Inc., a corporation of Delaware
Filed July 3, 1968, Ser. No. 742,425
Int. Cl. H03f 3/42, 3/50
U.S. Cl. 330—11                                          6 Claims

ABSTRACT OF THE DISCLOSURE

A transistorized driver circuit providing short circuit protection including a pnp transistor arranged as an emitter follower for driving a cable, and a current control circuit in the collector circuit of the pnp transistor for limiting the current flow through the pnp transistor to the cable to a safe value in the event the cable becomes short circuited. The current control circuit comprises an npn transistor having its collector connected to the collector of the pnp transistor, its emitter connected through an emitter resistor to a negative power supply, and its base connected to the junction of a first resistor and a second resistor forming a voltage divider, the voltage divider being connected between the power supply and ground.

BACKGROUND OF THE INVENTION

The present invention relates to a driver circuit and, more particularly, to a transistorized driver circuit including a current-limiting circuit for limiting current flow to a cable during short-circuit conditions.

Various driver circuits, including transistorized driver circuits, are known for driving loads such as cables. Additionally, various protection and current-limiting circuits are also known for preventing critical damage to such components as transistors due to the occurrence of short circuits in cables. For example, one known approach for providing short-circuit protection in a cable driver circuit is to employ a high power rated transistor. The high power rated transistor is employed such that the high power levels occurring during a short-circuit condition are dissipated by the transistor. As a result, serious damage to the components included in the driver circuit is prevented. A general disadvantage of using high power rated transistors for circuit-protection purposes is that these transistors often do not provide adequate protection against severe short-circuit conditions or against short-circuit conditions which exist for prolonged periods of time. Furthermore, high power rating transistors, particularly those operating at high frequencies, are often very costly and, consequently, increase the overall cost of driver circuits incorporating such transistors.

As an alternative approach to that discussed above, a reasonable amount of short circuit protection can be provided for a cable-driving transistor by placing a resistor in series with the output of the transistor, that is, between the output and the cable, such that current flow to the cable during a short-circuit condition is somewhat limited. While this simple expedient affords satisfactory short-circuit protection in many instances, the resistor has the undesirable effect of reducing the gain of the transistor thereby reducing the amount of current that would ordinarily be provided to the cable.

BRIEF SUMMARY OF THE INVENTION

Briefly, in accordance with the present invention, a driver circuit is provided for driving a load circuit coupled thereto and for affording short-circuit protection in the event a short-circuit condition occurs in the load circuit. The driver circuit in accordance with the present invention comprises a first circuit means coupled to a load circuit, for example, a cable, and a second circuit means coupled to the first circuit means and including a control means and a biasing means. In the absence of a short-circuit condition in the load circuit, the first circuit means, in response to input signals, operates to provide driving current to the load circuit. During the non-short-circuit condition, the biasing means is operative to bias the control means to a first operating condition during which the control means has substantially no effect on the current flow to the load circuit.

If, however, a short-circuit condition occurs in the load circuit, the biasing means operates in response to the short-circuit condition to cause the control means to be in a second operating condition. During the second operating condition, current of a predetermined safe value is provided to the load circuit. In this manner, the first circuit means is protected by the second circuit means from damage due to the occurrence of a short-circuit condition in the load circuit.

BRIEF DESCRIPTION OF THE DRAWING

The single figure illustrates a transistorized cable driver circuit for driving a coaxial cable and for providing short-circuit protection in accordance with the present invention.

DESCRIPTION OF THE INVENTION

Referring to the figure, there is shown in a dotted outline a transistorized driver circuit 1 in accordance with the present invention. As shown in the figure, the transistorized driver circuit 1 comprises a transistor emitter follower circuit 2 coupled to a cable C and to a negative voltage source $-V_{cc}$ through a transistorized current-limiting circuit 3. The purpose of the emitter follower circuit 2 is to provide current in response to input signals to drive the cable C. The purpose of the current-limiting circuit 3 is to limit the maximum current that can be provided to the cable C and to a pnp driver transistor $Q_1$ included in the emitter follower circuit 2 in the event a short-circuit condition develops in the cable C. The cable C may be a grounded-shield coaxial cable having a length of approximately 1000–1500 feet and a characteristic impedance of approximately 100 ohms. To prevent unwanted signal reflections at the far end of the cable C, the cable is terminated by a load resistance $R_L$ having a value equal to the characteristic impedance of the cable.

The emitter follower circuit 2 comprises the pnp driver transistor $Q_1$ having its base electrode directly connected to an input terminal 5 to which input signals are applied, its emitter electrode directly connected to a central conductor wire of the cable C, and its collector electrode directly connected to the collector electrode of an npn current-limiting transistor $Q_2$ included within the current-limiting circuit 3. The driver transistor $Q_1$ offers a high input impedance to input signals applied to the input terminal 5, and a low output impedance. The driver transistor $Q_1$ also offers substantially unity voltage gain. By way of a particular example, the driver transistor $Q_1$ may be a 2N4030-type transistor (power rating of 5 watts) which provides an input impedance of approximately 2 kilohms, an output impedance of approximately 100 ohms, and is capable of high-frequency operation. As may be noted, the 100-ohm output impedance is of the same value as the characteristic impedance of the cable C. The voltage gain of the 2N4030-type transistor $Q_1$ is slightly less than unity because of a small voltage drop across the base-to-emitter junction. The input signals applied to the input terminal 5 are high frequency (approximately 1–2 megahertz) negative-going analog signals having amplitude values ranging from zero volts to a maximum of V volts as indicated in the figure. A typical value for V is $-15$ volts.

The current-limiting circuit 3 comprises the aforementioned npn current-limiting transistor $Q_2$, an emitter resistor $R_e$ in the emitter circuit of the current-limiting transistor $Q_2$, and a resistance voltage divider VD. The voltage divider VD comprises a first resistor $R_1$ directly connected at one end to the base of the current-limiting transistor $Q_2$ and at the opposite end to one end of the emitter resistor $R_e$, and a second resistor $R_2$ connected at one end to the base of the current-limiting transistor $Q_2$ and at the opposite end to ground potential. The junction of the resistors $R_1$ and $R_e$ is connected directly to a negative power supply $V_{cc}$. By way of a specific example, the npn current-limiting transistor $Q_2$ may be a 2N3053-type transistor (power rating of 5 watts), $V_{cc}$ may have a value of $-20$ volts, and the resistors $R_1$, $R_2$, and $R_e$ may have respective values of 150 ohms, 500 ohms, and 22 ohms.

NORMAL OPERATION

The operation of the driver circuit 1 is as follows. Under normal operating conditions, that is, for values of input signals of zero to V volts (0–15 volts), the base-to-emitter junction of the pnp driver transistor $Q_1$ is forward biased and, therefore, the driver transistor $Q_1$ operates to supply driving current to the cable C. The minimum driving current applied to the cable C, corresponding to an input signal of zero volts, is zero milliamperes. The maximum driving current applied to the cable C, corresponding to an input signal of V volts, is $V/R_c$, where $R_c$ is the resistance of the cable C. For the above-mentioned values of $V=15$ volts and $R_c=100$ ohms, the maximum driving current in the cable C is 150 milliamperes.

During the normal operating condition of the driver circuit 1, the resistors $R_1$, $R_2$, and $R_e$ and the power supply $V_{cc}$ serve to forward bias the base-to-emitter junction of the npn current-limiting transistor $Q_2$ such that the base of the transistor $Q_2$ is more positive than the emitter, and the transistor $Q_2$ operates in the saturation region of its operating curve. For the above-mentioned zero-volt input signal, the current-limiting transistor $Q_2$ is deep in saturation and therefore provides a low impedance to current flow from the voltage source $V_{cc}$ to the collector of the driver transistor $Q_1$. For values of the input signal between zero volts and V volts, the current-limiting transistor $Q_2$ is increasingly less in saturation and its impedance gradually increases. However, the transistor $Q_2$ does not come fully out of saturation. It is to be appreciated, therefore, that under normal operating conditions, the current-limiting circuit 3 has no significant effect on the operation of the driver transistor $Q_1$. Accordingly, the current-limiting circuit 3 is effective only during short-circuit conditions as will now be discussed.

SHORT-CIRCUIT OPERATION

If the cable C for any reason becomes short circuited, the impedance of the cable C immediately decreases. The particular amount of the decrease in the impedance of the cable C depends on the extent and severity of the short-circuit condition and also on the location of the short circuit along the length of the cable. As the impedance of the cable C decreases, the current demand on the driver transistor $Q_1$ by the short-circuited cable C rapidly increases. It can be shown that the power $P_{Q_1}$ required to be dissipated by the driver transistor $Q_1$ where no current-limiting circuit 3 is used is equal to $$P_{Q_1}=\left(\frac{V_{cc}^2}{2}\right)/R_c$$

Thus, if the resistance $R_c$ of the cable C during short circuit is 10 ohms, for example, the power required to be dissipated by the driver transistor $Q_1$ is, from the above expression, 10 watts. If $R_c$ is equal to one ohm, during a very severe short circuit, for example, the power $P_{Q_1}$ required to be dissipated by the driver transistor $Q_1$ is, from the above expression, 100 watts. Clearly, these power levels greatly exceed the 5-watt power rating of the preferred 2N4030-type driver transistor $Q_1$. It is further clear that to use a high power rated pnp transistor having a high-frequency response in lieu of the driver transistor $Q_1$ of the present invention to dissipate 10 or 100 watts of power would be costly and, hence, a rather impractical solution to the short circuit problem described hereinabove.

The current limiting circuit 3 operates in the following manner to prevent damage to the driver transistor $Q_1$ during a short-circuit condition of the cable C. When the short-circuit condition occurs, the emitter-base junction of the transistor $Q_1$ becomes heavily forward biased and the transistor $Q_1$ goes deeply into saturation. The impedance of the transistor $Q_1$ decreases while the current through the transistor $Q_1$ increases. Because of the increased current flow, the voltage drop across the emitter resistor $R_e$ increases while the voltage at the base of the transistor $Q_2$ remains constant. The base-to-emitter junction of the current-limiting transistor $Q_2$ becomes only slightly forward biased, thus limiting the current that flows in its collector circuit. The current-limiting transistor $Q_2$ comes out of saturation, its impedance increases, and it conducts a limited amount of currrent to the cable C via the saturated driver transistor $Q_1$. The particular value of this current is determined from the particular values of the resistors $R_1$, $R_2$, and $R_e$, and from the value of the power supply $-V_{cc}$. For satisfactory operation, the value of the limited current should at least be equal to the maximum non-short-circuit current. For the above-mentioned values of $R_1$, $R_2$, $R_e$, and $-V_{cc}$, the value of the collector current produced by the transistor $Q_2$ is approximately 200 milliamperes. It is to be noted that at no time will the current to the cable C ever exceed 200 milliamperes even under severe or prolonged short-circuit conditions.

It can be shown that the power $P_{Q_2}$ dissipated by the transistor $Q_2$ under short-circuit conditions is expressed by $$P_{Q_2}=(V_{cc}-I_{Q_2}R_e-V_{Q_1})I_{Q_2}$$

where $V_{Q_1}$ is the voltage drop between the collector of the driver transistor $Q_1$ and ground, and $I_{Q_2}$ is the current produced in the collector circuit of the transistor $Q_2$. For the previously-mentioned values of $V_{cc}=-20$ v. and $I_{Q_2}=200$ milliamperes, and assuming a typical value of $V_{Q_1}\approx 0$, the maximum power $P_{Q_2}$ dissipated by the transistor $Q_2$ is approximately 3.1 watts, a value less than the 5-watt rating of the preferred 2N3053-type transistor $Q_2$.

It will now be apparent that a novel driver circuit capable of providing satisfactory short-circuit protection and characterized by substantially unity gain, high-frequency operation, and low cost has been disclosed in such full, clear, concise and exact terms as to enable any person skilled in the art to which such circuits pertains to construct and use the same. It will also be apparent that various changes and modifications may be made in the art without departing from the spirit and scope of the invention. Therefore, it is intended that the invention should not be limited except as by the appended claims.

What is claimed is:

1. A driver circuit for driving a load circuit coupled thereto and operable to provide short-circuit protection, comprising:

emitter follower circuit means operative in the absence of a short-circuit condition in a load circuit coupled thereto to provide driving current to the load circuit in response to input signals, said emitter follower circuit means including:

an input terminal for receiving said input signals; and a driver transistor having base, emitter, and collector electrodes, the base electrode being connected to the input terminal and the emitter electrode being adapted to be connected to the load circuit;

a first source of reference potential;
   a second source of reference potential; and circuit means coupled to the emitter follower circuit means and including:
  a current-limiting transistor having a first operating condition during which it has substantially no effect on the current flow to the load circuit and a second operating condition during which current of a predetermined safe value is provided to the load circuit, said current-limiting transistor having base, emitter, and collector electrodes, the collector electrodes being connected to the collector electrode of the driver transistor; and
  biasing means operative in the absence of a short-circuit condition in the load circuit to bias the current-limiting transistor to the first operating condition and operative in response to a short-circuit condition occurring in the load circuit to bias the current-limiting transistor in its second operating condition, said biasing means including:
    a first resistance connected between the first source of reference potential and the base electrode of the current-limiting transistor;
    a second resistance connected between the base electrode of the current-limiting transistor and the second source of reference potential; and
    a third resistance connected between the first source of reference potential and the emitter electrode of the current-limiting transistor.

2. A driver circuit in accordance with claim 1 wherein the values of the resistances and the first source of reference potential are selected such that the current of the predetermined safe value is at least equal to the maximum value of the current provided to the load circuit during the absence of a short-circuit condition in the load circuit.

3. A driver circuit in accordance with claim 2 wherein the input signals are varying-amplitude negative-polarity analog signals;
the driver transistor is of the pnp type;
the current-limiting transistor is of the npn type; and
the first source of reference potential is of a negative polarity.

4. A driver circuit for driving a cable terminated in its characteristic impedance and for providing short-circuit protection, comprising:
a first source of reference potential;
a second source of reference potential;
an emitter follower circuit comprising:
  (a) an input terminal adapted to receive high-frequency input signals; and
  (b) a high-frequency, substantially unity voltage gain driver transistor having a base electrode connected to the input terminal, an emitter electrode connected to the cable, and a collector electrode coupled to the first source of reference potential said driver transistor being forward biased by the input signals and operating in its unsaturated state in the absence of a short-circuit condition in the cable whereby driving current of a value depending on the amplitude of the input signals is provided to the cable; and
a current-limiting circuit comprising:
  (c) a current-limiting transistor having a collector electrode connected to the collector electrode of the driver transistor, a base electrode, and an emitter electrode;
  (d) a biasing arrangement for forward biasing the current-limiting transistor in the absence of a short-circuit condition in the cable whereby the current-limiting transistor operates in its saturated state and has substantially no effect on the current flow to the cable;
  (e) said biasing arrangement comprising:
    a first resistor connected between the first source of reference potential and the base electrode of the current-limiting transistor;
    a second resistor connected between the base electrode of the current-limiting transistor and the second source of reference potential, said first and second resistors forming a voltage divider; and
    an emitter resistor connected between the first source of reference potential and the emitter electrode of the current limiting transistor;
whereby said driver transistor operates in its saturated state in response to a short-circuit occurring in the cable, and the voltage drop across the emitter resistor increases upon the occurrence of a short-circuit in the cable by an amount such that the current-limiting transistor becomes less forward biased, operates in its unsaturated state, and provides current of a predetermined safe value to the cable via the saturated driver transistor, the predetermined safe value being determined by the specific values of the first and second resistors, the emitter resistor, and the first source of reference potential.

5. A driver circuit in accordance with claim 4 wherein the values of the resistors and the first source of reference potential are selected such that the current of the predetermined safe value is at least equal to the maximum value of the current provided to the cable during the absence of a short-circuit condition in the cable.

6. A driver circuit in accordance with claim 5 wherein the high-frequency input signals are varying-amplitude negative-polarity analog signals:
the driver transistor is of the pnp type;
the current-limiting transistor is the npn type; and
the first source of reference potential is of a negative polarity.

References Cited

UNITED STATES PATENTS 3,160,767   12/1964   Tindall _____ 307—220X
3,339,147   8/1967   Collins et al. _____ 330—28

NATHAN KAUFMAN, Primary Examiner

U.S. Cl. X.R.

330—18, 32